Patented June 22, 1943

2,322,554

UNITED STATES PATENT OFFICE 2,322,554

OIL REFINING

Charles C. Winding, Ithaca, N. Y., assignor to Tide Water Associated Oil Company, Bayonne, N. J., a corporation of Delaware No Drawing. Application April 9, 1941, Serial No. 387,608

15 Claims. (Cl. 196—147)

This invention relates to the refining of oils with adsorbents. More particularly, it relates to the use, in the refining of petroleum oils, of magnesium oxide adsorbent compositions of unique structure or form giving rise to enhanced properties and increased refining efficiency. The invention also includes as new products certain novel forms of magnesium oxide compositions.

The effectiveness of oil refining operations employing adsorbent materials depends primarily upon the characteristics and properties of the adsorbent materials used, and an ever present problem in the art is to develop improved adsorbents in order to obtain higher efficiency and increased commercial value in these operations. One of the essential requirements of such adsorbent materials is high activity. In contact decolorization of petroleum oils, for example, the decolorizing adsorbent used should have high decolorizing power. Other desirable properties of such adsorbents are high filter-rate (i. e., the rapidity with which the oil can be filtered from the adsorbent after contact therewith), minimum tendency to cause cracking of the oil, and high density.

Magnesium compositions of several different forms have been proposed for use as adsorbents in certain oil refining operations. For example, magnesium oxides produced by the calcination of the mineral magnesite at or above a dull red heat and the products produced by the calcination of magnesium hydroxides have been suggested for use in the decolorization of mineral oils. However, these forms of magnesium oxides have never been used extensively in such processes, the reason being mainly because they are of relatively low activity as compared with other available materials. In addition, they are generally deficient in one or more of the other properties desired in adsorbents.

I have discovered that magnesium oxide compositions can be prepared which range in activity all the way from substantially inactive forms to highly active adsorbents. The activity, as well as other important properties, depends primarily upon the physical form or structure of the particular composition. The structure or form in turn is dependent upon the method of preparation and the source materials used.

I have discovered that certain magnesium oxide compositions, derived by controlled calcination of suitable magnesium carbonates, possess unusually high activity with respect to their ability to remove undesirable constituents from petroleum oils in the refining thereof.

In my copending application S. N. 253,051, filed January 27, 1939, of which the present application is a continuation-in-part, I have disclosed one method by which these highly active magnesium oxide adsorbents can be produced. It is shown that a critical temperature range of below a dull red heat but above 300° C. exists within which suitable magnesium carbonates, for example artificially precipitated magnesium carbonates, can be calcined to produce magnesium oxide adsorbents having remarkably higher activities than magnesium oxides produced by calcining similar magnesium carbonates at temperatures outside said range. My adsorbents comprise predominantly magnesium oxide with relatively small proportions of water and carbon dioxide associated therewith. The water may be present to the extent of about 5 to 20% and the carbon dioxide to the extent of about 3 to 10%.

An important object of the present invention is to provide oil refining methods using the highly active magnesium oxide adsorbent compositions of said copending application.

As a result of studies of the molecular arrangement of magnesium oxides directed to a determination of the structure or form giving maximum activity, I have found that the activity of magnesium oxide is related to the degree of diffusiveness of the lines of the X-ray diffraction pattern. Data obtained upon subjecting magnesium oxide compositions to X-ray analysis show that those forms giving the more diffused lines are the more active adsorbents. Magnesium oxides produced by calcination of magnesium carbonate within the critical calcination temperature range, as disclosed in said copending application, exhibited greater diffusiveness of X-ray lines than did other magnesium oxide compositions.

X-ray analysis of three samples of magnesium oxide compositions of this invention which had been prepared by calcining precipitated magnesium carbonate at temperatures of 350° C., 410° C. and 390° C. respectively produced wide, diffused X-ray lines. The same procedure when applied to another magnesium oxide composition produced from the same precipitated magnesium carbonate but at a calcination temperature of 530° C. resulted in distinctly less diffused, substantially clear-cut X-ray lines. The respective decolorizing powers of these four materials in terms of O. D. values (optical density) when tested for efficiency in decolorizing petroleum lubricating oil by the contact method (to be fully described hereinbelow) is shown by the fact that they reduced the color of the initial oil of 2650 O. D. to 385 O. D., 430 O. D., 435 O. D. and 910 O. D. respectively. The lower O. D. values obtained indicate the more active materials. These data clearly show the described relationship between activity and diffusiveness of X-ray lines in magnesium oxide compositions. The latter named sample of sharply lower activity which was produced by calcination at or above a dull red heat is clearly distinguished by its clear-cut X-ray lines.

The X-ray analysis just described was made by the powder method known to crystallographers. The magnesium oxide to be analyzed was mixed with cellulose nitrate cement and extruded through an orifice to form a rod about 0.5 mm. in diameter. A 2 mm. section was cut from this rod and mounted on a goniometer head in the X-ray camera. The sample was given a 5° oscillation about the cylindrical axis during the exposure. The film, which was positioned in known manner cylindrically around the sample as a center, was exposed 4 hours at 16–18 milliamperes and 20 k. v. The target was copper, and a nickel foil filter was used to reduce the intensity of beta rays.

It should be understood that the comparative results obtained and recorded herein hold true because the same procedure was followed on all samples tested. Variation in the time of exposure, sample preparation, type of camera employed, and source and intensity of the X-rays would all affect the intensity and sharpness of the X-ray patterns.

It is well known that characteristic X-ray lines of certain substances are indicative of crystal or molecular structure. In the case of magnesium oxides of this invention tested as above, the highly diffused X-ray lines obtained indicate that the individual crystal lattices which have been formed are of relatively small size. Other workers have established that diffuse X-ray lines are obtained when the particle size (in this case the crystal size) is below 0.1 micron and above 0.001 micron where the particles become so small that they contain only a few crystalline planes. Inasmuch as the process of calcination involves the conversion of one solid (magnesium carbonate) into another (magnesium oxide), there must be some mechanism by which this process is accomplished. X-ray evidence indicates that the formation of magnesium oxide crystals starts at several centers or nuclei, within the solid carbonate, and that the growth does not continue throughout the entire particle under the conditions of calcination specified but forms a polycrystalline solid consisting of many small crystals of magnesium oxide plus some magnesium, oxygen, hydrogen, and carbon atoms which may or may not be oriented in any particular fashion. Regardless of the exact mechanism, the resulting solid particles are apparently made up of discontinuous crystals of magnesium oxide of such a size that highly diffused X-ray diffraction lines are obtained. I believe that the relatively high activity of the magnesium oxides of my said copending application is due to the small size of the ultimate crystals.

The theory that small crystal size causes high activity is further substantiated by the fact that magnesium oxides having high activity as indicated by diffused X-ray lines lose their activity and exhibit relatively undiffused, clear-cut X-ray lines after being heated to high temperatures, such, for example, as red heat. This phenomenon is apparently due to growth of the individual crystal lattices until a more or less continuous lattice is formed because of the greater mobility of the atoms at higher temperatures.

Although a definite relationship exists between crystal structure and decolorizing power, as has been shown, the particular crystal structure apparently does not govern certain other important properties of magnesium oxide preparations. For example, a magnesium oxide composition prepared by calcination of a precipitated magnesium carbonate at a temperature of above 300° C. but below a dull red heat, as stated hereinabove, will have maximum activity or decolorizing power, but may not necessarily possess the high density and high filter-rate characteristics desired in an adsorbent to be used in the contact decolorization of oils.

My copending application S. N. 387,607, filed April 9, 1941, describes and claims magnesium oxide compositions of novel form which possess unusually high filter-rate and high density characteristics. There it is shown that these desirable characteristics are due to the uniform particle size distribution and the particular particle form characterizing said compositions.

The present invention, therefore, includes as a preferred embodiment oil refining methods using as the active agents magnesium oxide compositions having the stated crystal size structure giving the diffused X-ray lines and consequent high activity, and the uniform particle size distribution and unique shape giving high filter-rate and high density set forth in my copending application S. N. 387,607.

The invention also includes as new products novel magnesium oxide oil refining compositions having these combined structural features and properties.

Referring in more detail to the magnesium oxide compositions of said copending application S. N. 387,607, these compositions in one illustrative case are prepared by precipitating under controlled conditions a basic magnesium carbonate having before drying the approximate composition

and after drying at 110° C. the approximate composition

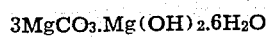

The precipitating conditions are carefully regulated to produce the stated outstanding unique characteristics in the resulting precipitate which account for the high filter-rate and high density of the subsequently prepared oxide. The particles of the magnesium carbonate compositions are characterized by a spherulitic or plate-like disc form in unusual uniformity of size distribution. Said compositions are of uniformity of particle size in relation to the proportional distribution of variously sized particles. These carbonates, when calcined, result in magnesium oxide compositions the particles of which are pseudomorphs of those of the carbonates, being of a spherulitic or plate-like disc form, and are of the stated uniform or even more uniform size distribution. The spherulitic plate or disc-like particles are made up of crystals radiating outward from the center of the particle. Illustrative magnesium oxide compositions comprise masses in which the average particle size of the particles present may fall within the range of 2 to 30 microns, but in which the proportional distribution of particle size throughout 90% or more of the particles in a given mass involves a deviation of not more than about 4 or 5 microns. There is present no material proportion of "fines." The apparent density is of the order of 20 pounds per cubic foot.

Magnesium oxide compositions, having the combined structural features set forth above, i. e., the small crystal size, uniform distribution of particles of spherulitic plate-like disc form, are novel compositions forming a part of the present invention. The properties of the compositions, combining high activity, high filter-rate, and high density make them exceptionally effective contact adsorbents in methods such as contact decolorization of oils. Their use in such methods is an object of this invention.

The following examples illustrate the preparation of oil refining compositions of the invention and their effectiveness when used in the contact decolorization of lubricating oils.

*Example I*

A precipitate of magnesium carbonate composition was prepared as follows:

Two solutions were prepared, one containing 413 grams of sodium carbonate in 6.25 liters of water, and the other containing 826 grams of magnesium chloride crystals (52% $MgCl_2$) in 6.25 liters of water. The sodium carbonate solution was placed in a four gallon vessel equipped with a motor driven propellor-agitator and heated to a temperature of 85° C. The magnesium chloride solution was heated to a temperature of 85° in a separate vessel. Then with the two solutions at the stated temperature and while agitating the carbonate solution by means of the propellor-agitator, all of the chloride solution was added to the carbonate solution in 15 seconds time. The agitation was continued for an additional 45 seconds. At the end of this period the agitator was stopped and the resulting magnesium carbonate slurry was allowed to stand and cool in quiescent condition for 30 minutes. At the end of the 30 minute period the slurry was filtered, and a sample of the precipitate was dried at 110° C. The dried precipitate was then examined microscopically to determine its particle shape and particle size distribution. Results of this examination showed the magnesium carbonate composition to be composed of spherulitic plate-like discs of unusually uniform particle size distribution. The weighted average diameter of the particles was 7.1 microns. 62.3% of the particles were of an average diameter of 5.7 microns, 36.8% were of an average diameter of 9.5 microns and 0.9% were of average diameter of 1.9 microns. There were substantially no particles of less than 1 micron or more than 10 microns in size. It is clear that 99.1% of the particles did not vary more than about 4 microns in average diameter. The shape of the individual particles appeared under the microscope as spherulitic, resembling plate-like discs built up of small crystals radiating outwardly from the center thereof.

The remainder of the magnesium carbonate precipitate was then transferred to a muffle furnace and calcined at a temperature between 380° C. and 400° C. for 20.5 hours. The calcined product, essentially magnesium oxide, was then removed from the furnace, allowed to cool, and examined microscopically. The particles of the calcined composition appeared as spherulitic platelike discs of the same shape as those of the carbonate and may thus be termed pseudomorphs thereof. The calcined product exhibited even more uniform particle size distribution than the carbonate product. Of the total particles present 95.5% were of an average diameter of 5.7 microns, 0.3% of an average diameter of 1.9 microns, and 4.2% of an average diameter of 9.5 microns. The weighted average diameter of all the particles was 5.8 microns. The apparent density of the calcined product was about 20 pounds per cubic foot.

40 grams of the magnesium oxide composition prepared in the manner stated above were agitated in a substantially closed vessel for 20 minutes at a temperature of 400° F. with 300 grams of an undewaxed Pennsylvania lubricating oil stock of 26.1 gravity, 50° F. pour point, 550° F. flash (closed cup) and 147 seconds Saybolt viscosity at 210° F. The mixture was then removed from the vessel and filtered on a laboratory Buchner filter. The filter-rate was determined to be 39.7 gallons of oil per square foot of filtering surface per hour. Other magnesium oxide compositions not having the particle size distribution and shape of my composition, when tested by this method, gave filter-rates of from zero to 5 gallons per square foot per hour.

The color of the treated oil was determined and compared with a sample of the original untreated oil. The optical density method was used in the test, the O. D. numbers being determined by the method described by Ferris & McIlvain in Industrial and Engineering Chemistry, Analytical Edition 6, 23 (1934). Directions as given in the stated reference were followed exactly except that a Bausch & Lomb monochromatic green filter was used as a source of monochromatic light. The high decolorizing power of the magnesium oxide adsorbent is shown by the fact that the original oil had an O. D. value of 2650 which after the decolorizing step was reduced to 500. Other adsorbent compositions of this invention prepared by the methods disclosed herein using calcining temperatures ranging from 325° C. to 440° C. exhibited decolorizing power represented by treated test oil colors corresponding to O. D. values in some cases as low as 325, using the same original oil of 2650 O. D. color.

These reductions in O. D. values from that of the original oil represent a very high degree of decolorization. A known commercial contact decolorizing adsorbent was tested by the same method for its decolorizing power using a sample of the same 2650 O. D. original oil as in Example I. This oil still had an O. D. value of 900 after treatment, indicating this adsorbent to be of considerably less activity.

*Example II*

Illustrating the invention in commercial aspect in contact filtration of lubricating oils, the charging stock is mixed with the desired quantity of magnesium oxide composition prepared as described above, and the mixture of oil and adsorbent is heated and agitated, the temperature depending upon the oil being treated and the results desired. Treatment temperatures of about 400° F. give maximum effectiveness when treating viscous lubricating oils, for example those of the type described hereinabove. The mixture is then filtered on a pre-coat rotary filter. Inasmuch as the magnesium oxide adsorbent has such a high filter-rate, it may be used as the pre-coat on the filter, thus obviating contamination which would result by use of certain filter-aids. The on-color stock requires no stripping with steam as is necessary in similar methods employing certain other contact adsorbents. The spent adsorbent is then washed by mixing with naphtha or the like and steaming. If desired, and in order to facilitate a continuous process, a suitable amount of the spent adsorbent may be bled off after the washing operation and replaced with fresh material. However, it is preferred to bleed off the required amount after the reburning or revivifying operation.

The reburning or revivifying operation consists in heating the spent adsorbent to a temperature sufficiently high to restore as much as possible of its activity or decolorizing power without deleteriously affecting its other desirable properties. In general satisfactory revivification may be accomplished by heating under conditions similar to those employed in calcining the magnesium carbonate in producing the original magnesium oxide adsorbent as described hereinabove and in my said copending application S. N. 253,051. Best results are obtained using a temperature of from about 380° C. to about 430° C. in the reburning operation.

One particular feature characteristic of the use of the adsorbents of the invention is that the adsorbent which is bled off is not discarded as is customary when using certain other contact adsorbents. According to this invention the bled off magnesium oxide material may be readily and economically converted to magnesium sulfate for use as a cheap starting material in the preparation of additional magnesium oxide adsorbent by the process set forth herein.

In addition to the relatively high degree of decolorization obtained, the method of this invention results in less cracking or other undesirable changes in the oil, and the treated oil is of better cast than is the case where certain other proposed adsorbents are used.

While in the above description certain conditions, such as ratio of adsorbents to oil, treatment temperature, etc., have been disclosed as preferable when practicing contact filtration according to this invention, it should be understood that the invention is not limited to use of said preferred conditions; nor is the invention to be considered as limited to decolorizing processes. The process of this invention is contemplated for use in refining any oil capable of being improved by treatment with these highly active materials.

I claim:

1. A process for refining oil comprising contacting said oil with an active magnesium oxide composition prepared by controlled calcination of artificially precipitated magnesium carbonate.

2. A process for refining oil comprising contacting said oil with an adsorbent comprising mainly magnesium oxide prepared by calcining magnesium carbonate at a temperature above 300° C. but below a dull red heat.

3. A process for decolorizing oil which comprises contacting said oil with an active adsorbent at elevated temperature, said adsorbent having been prepared by calcining magnesium carbonate at a temperature above 300° C. but below a dull red heat.

4. A process for refining a hydrocarbon oil which comprises contacting said oil with an active adsorbent comprising essentially magnesium oxide prepared by calcining artificially precipitated basic magnesium carbonate.

5. A process for refining a hydrocarbon oil which comprises contacting said oil with an adsorbent comprising magnesium oxide prepared by calcining artificially precipitated magnesium carbonate at a temperature above 300° C. but below a dull red heat.

6. In the decolorization of hydrocarbon oil by the contact method, the process comprising agitating said oil at elevated temperature with a finely divided active adsorbent comprising mainly magnesium oxide produced by calcining an artificially precipitated basic magnesium carbonate.

7. In the decolorization of hydrocarbon oil by the contact method, the process comprising agitating said oil at elevated temperature with a finely divided adsorbent comprising magnesium oxide produced by calcining basic magnesium carbonate at a temperature above 300° C. but below a dull red heat.

8. In the decolorization of hydrocarbon oil by the contact method, the process comprising agitating said oil at elevated temperature with a finely divided active adsorbent comprising magnesium oxide produced by calcining an artificially precipitated basic magnesium carbonate at a temperature above 300° C. but below a dull red heat.

9. A process for refining oil comprising contacting said oil with an adsorbent containing magnesium oxide exhibiting diffuse X-ray diffraction lines of the diffusiveness obtained by calcining magnesium carbonate at a temperature above 300° C. but below a dull red heat.

10. A process for decolorization oil comprising agitating a mixture of said oil and an active adsorbent comprising magnesium oxide exhibiting diffuse X-ray diffraction lines of the diffusiveness obtained by calcining magnesium carbonate to magnesium oxide at a temperature above 300° C. but below a dull red heat, and separating the oil and adsorbent.

11. A process for refining oil comprising contacting said oil with an active, rapid filtering adsorbent of relatively high apparent density comprising mainly magnesium oxide, said adsorbent having been prepared by calcination of a precipitated basic magnesium carbonate the particles of which are spherulitic plate-like discs uniformly distributed as to particle size.

12. In the decolorization of hydrocarbon oil by the contact method, the process comprising agitating a mixture of said oil and an active adsorbent comprising mainly magnesium oxide, said magnesium oxide having been prepared by calcining magnesium carbonate at a temperature above 300° C. but below a dull red heat, separating the oil and spent adsorbent, reheating the spent adsorbent to revivify the same, and returning the revivified adsorbent to the contacting process for reuse.

13. In the decolorization of hydrocarbon oil by the contact method, the process comprising contacting a mixture of said oil and an active magnesium oxide adsorbent, said adsorbent having been prepared by precipitating magnesium carbonate, calcining said magnesium carbonate, removing decolorized oil from the spent adsorbent, converting at least a part of the spent magnesium oxide adsorbent into a magnesium salt and using said magnesium salt to precipitate more of the magnesium carbonate.

14. A composition of matter suitable for use as an adsorbent for oil refining having high oil decolorizing power, high density and high filter-rate formed by calcining a basic magnesium carbonate having spherulitic plate-like disc-shaped particles uniformly distributed as to particle size at a temperature above 300° C. and below 450° C.

15. A magnesium oxide composition suitable for use as an adsorbent in the contact decolorization of oils formed by calcining within a temperature range of from about 325° C. to about 440° C., a precipitated basic magnesium carbonate composed of relatively small particles at least about 90% of which are within a 4 or 5 micron size deviation.

CHARLES C. WINDING.